April 6, 1954  R. P. WILKINSON  2,674,152
BINOCULAR COMPARISON MICROSCOPE
Filed June 30, 1952

Rudolph P. Wilkinson
INVENTOR.

BY *[signatures]*
Attorneys

Patented Apr. 6, 1954

2,674,152

UNITED STATES PATENT OFFICE 2,674,152

BINOCULAR COMPARISON MICROSCOPE

Rudolph P. Wilkinson, McCamey, Tex., assignor of forty-nine per cent to John C. Epperson, Sr., Alpine, Tex.

Application June 30, 1952, Serial No. 296,340

12 Claims. (Cl. 88—14)

This invention relates to comparators and more specifically to comparison microscopes and it has for its main object to provide a comparison microscope of the binocular type producing stereoscopic effects which is so constructed that it permits to compare a specimen or object viewed with stereoscopic effect with one or more of a number of standard specimen selected from a large number of such standard specimen kept in readiness, likewise viewed, simultaneously with the test object, or specimen as a stereoscopic picture.

The known comparators or comparison microscopes when monocular, usually either have a divided field or two separate field sections viewed through the same ocular lens, with the test specimen, object or surface viewed in one section of the field, while a standard specimen, object or surface is simultaneously viewable in another section of the field. Such comparison microscopes are usually constructed for industrial use and more specifically for the inspection of manufactured articles. The inspection is carried out to determine whether a manufactured article corresponds to a certain specification or has a prescribed finish or certain qualities or the like. The test specimen is therefore constantly changed while the standard specimen remains always the same for all tests. A standard specimen can therefore be stored at any place as only one standard specimen at a time is mounted and fixed in an effective position with respect to the objective of the microscope.

In specific cases it has also been proposed to use a binocular stereoscopic comparison microscope for the purpose of comparing three dimensional objects of articles with a three dimensional standard article.

This invention intends to provide for such cases in which the nature of test specimen is to be determined by comparing it with one or with a plurality of a large number of standard specimen. The general constructive idea of such a comparison microscope is different from the one embodied in microscopes, such as above described, as a single test specimen must be compared with one or a plurality selected from a large number of specimen without a complex manipulation, so that a large number of standard specimen have to be kept in readiness. This type of comparison microscope therefore involves the use of a magazine containing a large number of specimen in an arrangement which brings the selected specimen quickly and readily into the viewing field of the microscope.

Such magazines containing standard specimen in large numbers are however extremely difficult to construct in the event that a binocular microscope for stereoscopic views is used. The invention therefore consists mainly in the overcoming of these difficulties.

According to the invention a magazine is provided containing a movable member carrying a large number of three dimensional comparison standards which magazine is associated with a binocular stereoscopic microscope in such a manner that the standard object and test object to be compared with each other are viewed stereossopically. The magazine therefore does not contain the actual three dimensional standard objects with which the test specimen has to be compared, but is provided with stereoscopic pictures of the said standard object the latter being thus reconstructed from pairs of binocular photographic pictures taken from different viewpoints but viewed simultaneously which furnish a stereoscopic three dimensional view of the standard object simultaneously with the focussing of the comparison miscroscope on the test specimen or object.

Furthermore the pictures from which the steroscopic views of the standard objects are derived are taken on an angle which is equal to the angle under which the lenses of the microscope view the test object so that a direct comparison of the test sample and the standard object is possible which permits a ready identification of all properties which are substantially identical or alike and therefore permits a quick and easy classification of the object in question.

The invention has therefore, in addition to the above mentioned main object, the further principal object to provide a magazine or holder for a number of stereoscopic pictures which is in fixed connection with a binocular stereoscopic microscope and which permits to bring a pair of pictures of a standard object simultaneously into focus of the binocular microscope with the focussing of the test object and which further permits to change the pair of pictures producing the stereoscope object of the standard object quickly while the test sample or object remains focussed in the microscope.

A further object of the invention consists in so arranging the magazine that a large number of pairs of pictures of standard of specimen can be housed in the same and can be brought into focus successfully or in any desired order by a simple manipulation.

A further object of the invention consists in providing a cylindrical member adapted to be displaced within a cylindrical housing, said member being provided with series of pictures arranged in pairs, the pairs cooperating to furnish a stereoscopic view. The series encircle the cylindrical member, the pairs of series being axially so spaced as to be brought simultaneously before the focussing member of the two optical systems of the microscope.

A number of further objects of a more specific nature will be apparent from the following detailed specification.

The invention is described with reference to the accompanying drawings illustrating one embodiment thereof by way of example. It is however to be understood that the example shown has been selected in order to explain the principle of the invention and the best mode of applying said principle. The example does not in any way provide a survey of all the possible embodiments of the invention and a departure from the example which has been illustrated is therefore not necessarily a departure from the principle of the invention.

As has been explained above the stereoscopic comparator according to the invention is essentially an instrument in which stereoscopic and microscopic pictures have to be compared with each other and it is more particularly an instrument in which a picture of a test sample has to be compared either with a large number of standard objects or samples or with one of a plurality of a large number of such standard objects or samples. Essentially therefore, the instrument in addition to the optical means for producing microscopic and stereoscopic pictures is provided with a magazine or container holding means for producing a large number of comparison standard pictures, and is further provided with means for bringing pairs of standard pictures producing stereoscopic views rapidly into a focussing position in which the stereoscopic view can be used simultaneously with the viewing of the test object.

Figure 3:
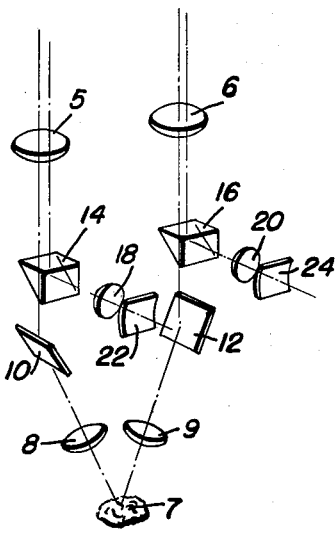
Figure 3 is a diagram illustrating the optical principles which are used and also illustrating the path of the rays through the optical unit.
Figure 4:
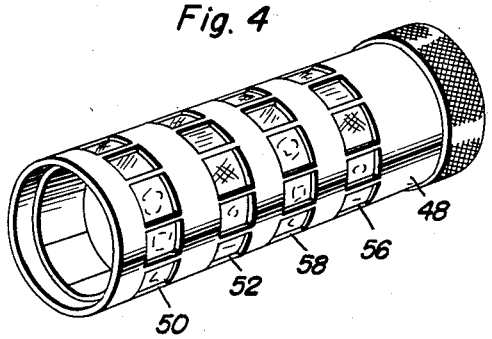
Figure 4 is a perspective view of the cylindrical picture carrier.

The optical principle according to which the comparison microscope according to the invention is built is illustrated in Figure 3 of the drawing in which the ocular lenses 5, 6 of the binocular microscope are so arranged that their axes are in parallel.

The microscope may be further provided with objective lenses 8, 9, so arranged with respect to the test specimen to be viewed by the microscope that the angle of view corresponds to that of the pupillary distance. In addition convergent lenses may be used. In the diagram the objective lenses 8, 9 are arranged in front of mirrors 10, 12 reflecting the rays from the objective towards the oculars in parallel lines. It will however be clear that this mirror arrangement becomes unnecessary if the optical systems of the two sections of the binocular microscope are arranged in such a manner that the optical axes are at an angle with respect to each other.

In a manner well known in connection with comparison microscopes the field visible in each ocular lens 5, 6 is divided. About half of the field is occupied by the image received through the objective lenses while the other half of the field is occupied by an image received through the reflecting refraction prisms 14, 16, respectively, which prisms reflect the rays which emanate from the two diapositives 22, 24 containing the stereo-pictures of a standard specimen. Lenses 18, 20 may be interposed between the diapositives and the prisms. The picture of the specimen is preferably taken on the same angle or with the pupillary distance with which the object 7 is viewed through the objectives 8 and 9.

As above stated the prisms 14, 16 occupy approximately one-half of the field of view of the observer and the microscopic stereo-pictures in three dimensions of the object 7 is therefore seen adjacent to a stereoscopic picture in three dimensions of the standard specimen.

The optical system diagrammatically illustrated in Figure 3 is housed in a casing 25 carrying a lid 26 on which the two ocular collars or tubings 28, 30 are mounted. The lens systems of the ocular systems themselves may be mounted in sleeves 32, 33 and may be displaceable for focussing purposes and moreover a micrometric reticle may be mounted on the ocular carrying member, if desired.

Figure 1:
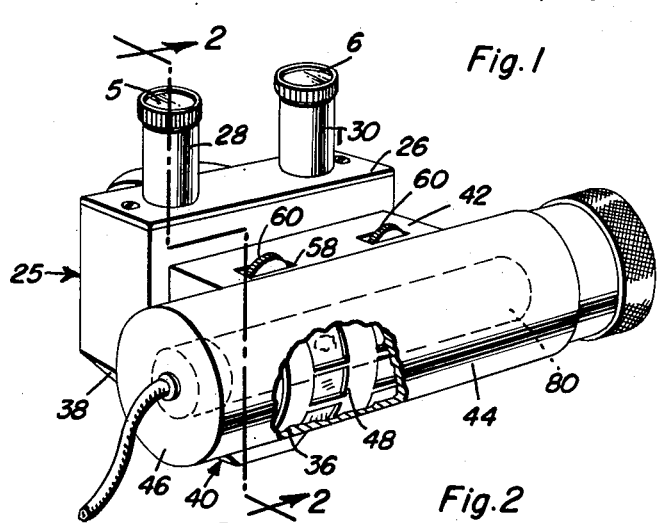
Figure 1 is a perspective view of the binocular microscope.
Figure 2:
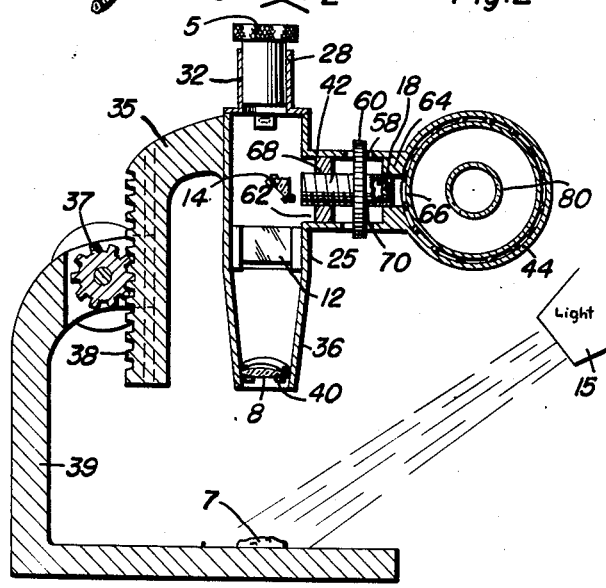
Figure 2 is an elevational sectional view through the comparison microscope the section being taken along line 2—2 of Figure 1.

The casing carries the arm 35 provided with the focusing means 37, 38 connected with the stage 39 carrying the sample to be viewed or with those simplified object focusing and carrying means which take the place of the conventional means. Figure 2 shows a simplified structure, but it will be understood that this part of the microscope is not modified by the changes required to incorporate the invention and therefore any conventional or known structure which is adapted to the special purpose in view may be adopted.

The sample 7 in the example illustrated in Figure 2 is viewed by means of reflected light coming from a source 15, but it is to be understood that the stage may be arranged with means for introducing transparent samples and the conventional mirror directing light coming from the side towards the specimen may be used as well.

In the example shown the casing 25 is provided on its underside with an objective carrying portion 36 with tapering walls converging towards the opening 40. Within this portion the objectives 8, 9 are arranged.

On the front side of the case 25 there is a lateral extension 42 at the end of which the cylindrical magazine 44 is arranged. The cylindrical magazine 44 may be a cylinder which is completely closed along the cylindrical surface but which is open towards the extension 42 of the casing. These windows face a pair of displaceable, threaded tubes 70 carrying lenses 18 (or 20) which in their turn face the reflecting refraction prisms 14 (or 16). The picture focused by the lens 18 (or 20) will thus be seen in the ocular lens 5 (or 6).

The displaceable tubes 70 are carried by shields or walls 62, 64 which are held within the extension 42. Wall 64 closes the end of the extension open towards the cylindrical container 44 and may therefore be provided with a curved cylindrical surface at its outer side conforming itself to the shape of the cylindrical magazine. The wall 62 serves as a light shield and therefore is inserted into the extension 42 in a light tight manner and is covered with black dull finish.

Both tube supporting walls are provided with bores 66, 68 for each tube, the bore 66 being smooth and serving as a bearing for the tube 70 which fits into the same with friction.

The bore 68 in the light shield wall 62 is threaded and these threads engage corresponding threads on the outside of the tube 70. Rotation of the tube therefore displace the latter longitudinally, the end of the tube in which the lens 18 (or 20) is mounted, sliding within the bore 66 of the end wall 64.

To rotate the tube 70 disks 60 with knurled rims are fixedly secured on the tubes which project outwardly through slots 58 of the extension 42. These knurled disks are rotated by hand thus permitting to bring the picture into focus, so that the focused portion may be reflected towards the ocular by the reflecting prisms 14, 16 which are arranged within the casing in the manner above described so that they cover about half of the field viewed through the ocular lens.

Within the cylindrical magazine 44 a hollow cylindrical picture carrier 48 is held which is provided with means for holding axially spaced series 50 . . . 56 of diapositive pictures arranged around the cylinder periphery. Each series contains as large a number of pictures as possible, the number depending on the size of the diapositives and on the diameter of the cylinder, and the axial spacing of the series is such that two coordinated series containing the two pictures necessary for producing the stereoscopic views are always facing the opening 66 of the wall 64 simultaneously. As above mentioned the two series contain pictures taken under an angle corresponding to the interpupillary distance and they therefore produce a stereoscopic image when viewed simultaneously through the ocular lenses 5, 6. As many pairs of series as necessary to hold the pictures of all standard comparison test objects are arranged along the cylinder. Obviously the space between coordinated series of pictures may be utilized to hold one or a plurality of further series so that the cylindrical surface can be fully utilized and can be covered by a large number of picture series.

At the end of the cylindrical picture carrier 48 may be provided with a knurled gripping ring permitting to seize the picture carrier and to rotate it within the magazine 44 and also to advance it axially so as to bring axially spaced picture series of standard objects into register with the windows facing the prisms.

If the number of standard comparison objects is very large a number of picture carriers may be associated with each microscope and the picture carriers may be so arranged that they may be inserted and withdrawn easily from the magazine. However, as a rule, it is possible to have four and more pairs of series on each cylinder, each series carrying ten to twelve or more different pictures so that the number of standard objects which may be viewed and with which the test specimen or object may be compared is amply sufficient for the purpose in question.

The diapositives which are inserted into the windows or frames of the member 48 are preferably illuminated by a lamp structure 80 (shown only diagrammatically) arranged coaxially with the cylinder and extending axially within the same. This lamp may be mounted in a socket mounted on the closed end 46 of the magazine 44.

A comparison microscope of the type described is mainly usable for geological or petrographic purposes which, as a rule, entail the comparison of rock or other petrographic specimen with standard specimen in order to be able to classify exactly. Further the microscope may be used in all cases in which the standard specimen are too fragile or too brittle or too valuable to be handled directly so that pictures may preferably be used with advantage. Such microscopes may also be used in connection with industrial processes in which samples have to be taken during the process and have to be compared with a number of standards in order to properly direct the process, to be able to obtain the desired results.

It will be clear that a number of unessential details may be changed without in any way departing from the essence of the invention as defined in the annexed claims.

Having described the invention, what is claimed as new is:

1. A binocular comparison microscope adapted for a simultaneous stereoscopic view of a sample and of a comparison standard, comprising two optical systems, including ocular and objective lenses arranged for a stereoscopic view of the sample object, in a divided field, showing said object in one section of said divided field, and a plurality of pairs of photographic stereo-pictures of the comparison standard object, arranged on a movable stereo-picture carrier, two further objective lenses adapted to cooperate with the ocular lenses of the aforesaid optical systems, a deflecting means cooperating with said further objective lenses for deflecting the rays emanating from the pictures to provide stereo-pictures in a second section of the divided field, the movable stereo-picture carrier being displaceable relatively to said further objective lenses, said pairs of stereo-pictures being alternatively brought into operative alignment with said further objective lenses upon movement of the movable stereo-picture carrier.

2. A binocular comparison microscope adapted for a simultaneous stereoscopic view of a sample and of a comparison standard, comprising two optical systems arranged for a stereoscopic view of the sample object in a divided field, showing said object in one section of said divided field, pairs of photographic stereo-pictures of the comparison standard object arranged in planes parallel to the said optical axes of the binocular microscope, and ray deflecting refraction prisms facing the said stereo-pictures of the sample object near said optical axes of the binocular microscope, deflecting the rays emanating from the pictures into the direction of the optical axes and into a section of the viewing field.

3. A binocular comparison microscope as claimed in claim 2, comprising a movable picture carrier carrying a plurality of stereoscopic pictures of comparison standard objects.

4. A binocular comparison microscope as claimed in claim 2, comprising a cylindrical movable picture carrier provided with a series of stereoscopic pictures of comparison standard objects, arranged around the cylindrical periphery of the picture carrier.

5. A binocular comparison microscope as claimed in claim 2, comprising a cylindrical picture carrier, provided with a plurality of axially spaced series of stereoscopic pictures of comparison standard objects, each series being arranged around the cylindrical periphery of the picture carrier and the series being arranged in axially spaced pairs, two axially spaced series of complementary stereoscopic pictures of the sample object always facing simultaneously the deflecting refraction prisms associated with the optical systems.

6. A binocular comparison microscope comprising a casing, lenses of two optical systems held by said casing, said optical systems being adapted for the stereoscopic view of a sample object in a divided viewing field, said object being shown in one direction of the viewing field, reflecting refraction prisms near the optical axes of the optical systems, an extension casing and a magazine held by the same, a picture carrier within said magazine, said picture carrier being provided with a plurality of pairs of cooperating stereoscopic pictures of comparison standard objects, one pair of the said pictures facing the deflecting refraction prisms, so as to produce a three dimensional picture of the comparison standard object in one section of the viewing field of the binocular microscope simultaneously with the production of a stereoscopic image of the sample object viewed through the optical systems in the other section of the field.

7. A binocular comparison microscope as claimed in claim 6, wherein the magazine is a cylinder, substantially closed along its cylindrical surface which is joined to and open towards the extension casing.

8. A binocular comparison microscope as claimed in claim 6, wherein the picture carrier is a cylinder and is provided with a plurality of pairs of cooperating stereoscopic pictures aligned along a generatrix of its cylindrical surface and spaced axially so as to bring said picture simultaneously into registry with the bores in the cylindrical magazine wall.

9. A binocular comparison microscope as claimed in claim 8, wherein the cylindrical picture carrier is mounted for rotation and for axial displacement in the cylindrical magazine.

10. A binocular comparison microscope as claimed in claim 8, wherein the cylindrical picture is mounted for rotation and for axial displacement in the cylindrical magazine and wherein the cylindrical picture carrier is provided with a plurality of axially spaced pairs of series of stereoscope pictures of comparison standard objects, the pairs of series encircling the cylindrical surface and consisting of cooperating photographic stereoscopic pictures of a comparison standard object, being brought successively into the viewing field by rotation of the cylinder picture carrier, further axially spaced pairs of series being brought into operative position by an axial shift of the picture carrier.

11. A binocular comparison microscope as claimed in claim 6, wherein the magazine is cylindrical and is joined to and open towards the extension casing, a wall closing the open side of the cylindrical magazine, said wall being provided with a pair of bores, adapted to face the cooperating stereoscopic pictures carried by the picture carrier, tubes containing lenses within said bores, the axes of the tubes and of the lenses being aligned with the reflecting refraction prisms.

12. A binocular comparison microscope as claimed in claim 11, wherein a further wall with threaded bores is provided within said extension casing and wherein the tubes are threaded on their outside and engage the threaded bores of the further walls, discs secured to the tubes and projecting to the outside, said discs adjusting the position of the tubes and thereby of the lenses within the tubes, relatively to the stereoscopic pictures in the picture carrier.

References Cited in the file of this patent

UNITED STATES PATENTS

| Number | Name | Date |
|---|---|---|
| 1,558,585 | Boykow | Oct. 27, 1925 |
| 2,296,765 | Brost | Sept. 22, 1942 |
| 2,406,526 | Bennett et al. | Aug. 27, 1946 |
| 2,510,145 | Short | June 6, 1950 |
| 2,530,531 | McClellan | Nov. 21, 1950 |